(12) United States Patent
Choksi

(10) Patent No.: US 7,721,763 B2
(45) Date of Patent: May 25, 2010

(54) ADJUSTABLE PRESSURE RELIEF VALVE

(76) Inventor: Pradip Choksi, 9614-F Cozycroft Ave., Chatsworth, CA (US) 91311

( * ) Notice: Subject to any disclaimer, the term of this patent is extended or adjusted under 35 U.S.C. 154(b) by 222 days.

(21) Appl. No.: 12/008,011

(22) Filed: Jan. 8, 2008

(65) Prior Publication Data

US 2009/0173391 A1 Jul. 9, 2009

(51) Int. Cl.
*F16K 15/14* (2006.01)
(52) U.S. Cl. ........................ 137/859; 137/537; 137/515.5
(58) Field of Classification Search ............... 137/852, 137/537, 15.01, 859, 315.11, 515.5, 515
See application file for complete search history.

(56) References Cited

U.S. PATENT DOCUMENTS

| | | | |
|---|---|---|---|
| 208,379 A * | 9/1878 | Downey et al. ............ 137/496 |
| 365,093 A | 6/1887 | Petzold | |
| 1,976,098 A | 10/1934 | Smith | |
| 2,249,971 A | 7/1941 | Mecorney | |
| 2,710,004 A | 6/1955 | Stamper | |
| 3,063,461 A | 11/1962 | Rudolph | |
| 3,132,665 A | 5/1964 | Rovin et al. | |
| 3,373,743 A | 3/1968 | Saffir | |
| 3,386,470 A | 6/1968 | Goda et al. | |
| 3,447,479 A | 6/1969 | Rosenberg | |
| 3,572,375 A | 3/1971 | Rosenberg | |
| 3,626,978 A | 12/1971 | Hoekstra | |
| 3,633,613 A | 1/1972 | Julow | |
| 3,661,174 A | 5/1972 | Cripe | |
| 3,727,614 A | 4/1973 | Kniazuk | |
| 3,807,445 A | 4/1974 | McPhee | |
| 3,845,786 A | 11/1974 | Papst et al. | |
| 3,905,386 A | 9/1975 | Rachocki | |
| 3,949,934 A | 4/1976 | Goglio | |
| 3,954,121 A | 5/1976 | Kardos | |
| 3,957,052 A | 5/1976 | Topham | |
| 4,045,009 A | 8/1977 | Pees | |

(Continued)

FOREIGN PATENT DOCUMENTS

GB 2077397 A * 6/1980

OTHER PUBLICATIONS

Plast-O-Matic Valves, Inc.; "Self-Closing Diaphragm Check Valves . . . Molded in Three Sizes", Catalog CKM-2; Dec. 1993; 2 pages.

(Continued)

*Primary Examiner*—John Rivell
*Assistant Examiner*—Macade Brown
(74) *Attorney, Agent, or Firm*—Stetina Brunda Garred & Brucker

(57) ABSTRACT

A one-way flow valve is provided wherein the one-way flow valve may comprise a first section and a second section of a housing. A valve member may be disposed between the first and second sections of the housing that permit fluid flow through one direction of the one-way flow valve but prevents fluid from flowing in the reverse direction. The opening pressure (i.e., the pressure differential across the valve member) to permit flow through the one-way flow valve may be increased or decreased by inserting (e.g., threadably engaging) the second section of the housing deeper into the first section of the housing or withdrawing (e.g., threadably disengaging) the second section of the housing from the first section of the housing.

12 Claims, 4 Drawing Sheets

U.S. PATENT DOCUMENTS

| | | |
|---|---|---|
| 4,051,852 A | 10/1977 | Villari |
| 4,084,606 A | 4/1978 | Mittleman |
| 4,210,173 A | 7/1980 | Choksi et al. |
| 4,244,379 A | 1/1981 | Smith |
| 4,566,493 A | 1/1986 | Edwards et al. |
| 4,593,720 A * | 6/1986 | Bergandy .................. 137/859 |
| 4,712,583 A | 12/1987 | Pelmulder et al. |
| 5,727,594 A | 3/1998 | Choksi |
| 6,343,686 B1 | 2/2002 | Whiting et al. |

OTHER PUBLICATIONS

Burron OEM Division; "Quality Check Valves from Burron"; 1994; 1 pg.

Medlit; "High Flow Back Check Valve"; Nov. 1994; 1 pg.

"Vernay V-Ball" Valve; 1 pg.

"Umbrella Check" Valve, 1 pg.

"Duckbill" Valve, 1 pg.

\* cited by examiner

ADJUSTABLE PRESSURE RELIEF VALVE

CROSS-REFERENCE TO RELATED APPLICATIONS

Not Applicable

STATEMENT RE: FEDERALLY SPONSORED RESEARCH/DEVELOPMENT

Not Applicable

BACKGROUND

In medical fluid handling applications, one-way flow valves are typically used in situations where blood is being drained from a patient's wound site or urine drained from a patient's bladder. The blood or urine may be drained into a collection bag or container. Typically, the drainage of blood or urine may be accomplished through placing the drainage bag or container below the patient. Gravity may then force the fluid out of the patient and into the bag or container. During the drainage procedure, the drainage bag or container may be raised above the patient to check the level of the fluid or for some other purpose. Undesirably, the urine or blood may flow back into the patient's body. To prevent such situation, prior art one-way flow valves have been invented that permit the fluid to flow from the patient's body to the drainage bag or container but do not allow a reverse flow of fluid back into the patient from the drainage bag or container. One effective one-way flow valve is disclosed and described in U.S. Pat. No. 5,727,594, issued to Pradip Choksi. The device disclosed in the Choksi disclosure permits fluid to flow through the one-way flow valve at a very low opening pressure. However, when the pressure differential across the one-way flow valve is negative, the one-way flow valve does not permit reverse flow of fluid back into the patient.

As can be expected, the pressure across the one-way flow valve required to open or allow fluid flow through the one-way flow valve should be very low in such circumstances. The blood or urine should readily flow out of the patient's body without significant flow resistance by the one-way flow valve. For example, the one-way flow valve should permit fluid to flow through the one-way flow valve at a pressure differential across the one-way flow valve at between 0 PSI to about 2 PSI.

In certain other medical applications, it is also desirable to increase or decrease the opening pressure based on the medical application. For example, it may be desirable to have the opening pressure set at 1 PSI, whereas in other medical applications, it may be desirable to set the opening pressure at 1.5 PSI. Unfortunately, prior art one way flow valves have a pre-set opening pressure. Moreover, in low opening pressure applications, it is difficult to precisely control the opening pressure of the one way flow valve.

Accordingly, there is a need in the art for an improved one-way flow valve.

BRIEF SUMMARY

The one-way flow valve discussed herein addresses the needs in the art discussed above, discussed below and those that are known in the art. The one-way flow valve may comprise a first section of a housing and a second section of the housing, and a valve member disposed within the housing. The second section of the housing may be inserted into the first section of the housing to a selected depth to increase or decrease an opening pressure at which fluid will bypass the valve member and flow through the one-way flow valve. When a pressure difference across the valve member is greater than or equal to the opening pressure, then fluid will flow through the one-way flow valve. Conversely, when the pressure difference across the valve member is less than the opening pressure, then fluid will not flow through the one-way flow valve.

In an embodiment of the one-way flow valve, the valve member may have a disc portion biased against a rim portion or periphery of an orifice in the first section of the housing. The opening pressure of the one-way flow valve is directly proportional to the biasing force biasing the disc portion against the rim portion. To increase or decrease the biasing force applied to the disc portion on the rim portion, the second section of the housing may be inserted deeper into or withdrawn from the first section of the housing. By way of example and not limitation, the first and second sections of the housing may be threadably engaged. To insert the second section of the housing deeper into the first section of the housing, the second section of the housing may be threaded deeper into the first section of the housing. As the second section of the housing is inserted or threadably engaged deeper into the first section of the housing, the biasing force of the spring increases thereby also increasing the opening pressure of the one-way flow valve. Conversely to withdraw the second section of the housing from the first section of the housing, the second section of the housing may be withdrawn from the first section of the housing to have a shallower engagement between the threads of the first and second sections of the housing. As the second section of the housing is withdrawn from the first section of the housing, the biasing force decreases thereby also decreasing the opening pressure of the one-way flow valve.

The valve member may be secured to the upstream end portion of the second section of the housing with a collet. In particular, the valve member may have a flange portion. The flange portion may be connected to the spring of the valve member. An opposed distal end of the spring may be attached to the disc portion of the valve member. To attach the flange portion of the valve member to the second section of the housing, the collet and the second section of the housing may form respective notches that collectively receive the flange of the valve member. The second section of the housing may be inserted into the collet. When the second section of the housing is fully inserted into the collet, the flange of the valve member may be wedged inside the notches of the collet and a notch in the housing's second section. The collet and the second section of the housing may then be permanently attached to each other such as by way of example and not limitation adhesion, ultrasonic welding, etc. Initially, the disc portion may be in the same plane as the flange. After the first and second housing sections are engaged to each other, the disc portion may be traversed along a longitudinal axis of the one-way flow valve within the second section of the housing to increase or decrease the opening pressure of the one-way flow valve. The flange may provide a fluid tight seal between the collet and the second section of the housing. Moreover, an o-ring may be disposed about the collet. The o-ring may engage an inner surface of an outer cylindrical wall of the housing's first section to form a fluid tight seal between the first section of the housing and the collet.

In an embodiment of the one-way flow valve, it is contemplated that the o-ring may alternatively be disposed within an inner periphery of the collet and form a fluid tight seal between the collet and an inner cylindrical wall of the first section of the housing.

In a further embodiment of the one-way flow valve, the valve member may also have a hat shaped configuration. The disc portion may be offset from a lip portion. The lip portion may be attached to the upstream end portion of the second section of the housing via methods known in the art or developed in the future such as by way of example and not limitation, adhesion, sonic welding, etc. Moreover, the hat shaped valve member may have connecting arm portions that stretch to increase the biasing force imposed on the disc portion of the valve member against the rim portion. In contrast, in the prior embodiments of the one-way flow valve, the disc portion may have connecting arm portions that flex or bend to increase the biasing force of the disc portion against the rim portion.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
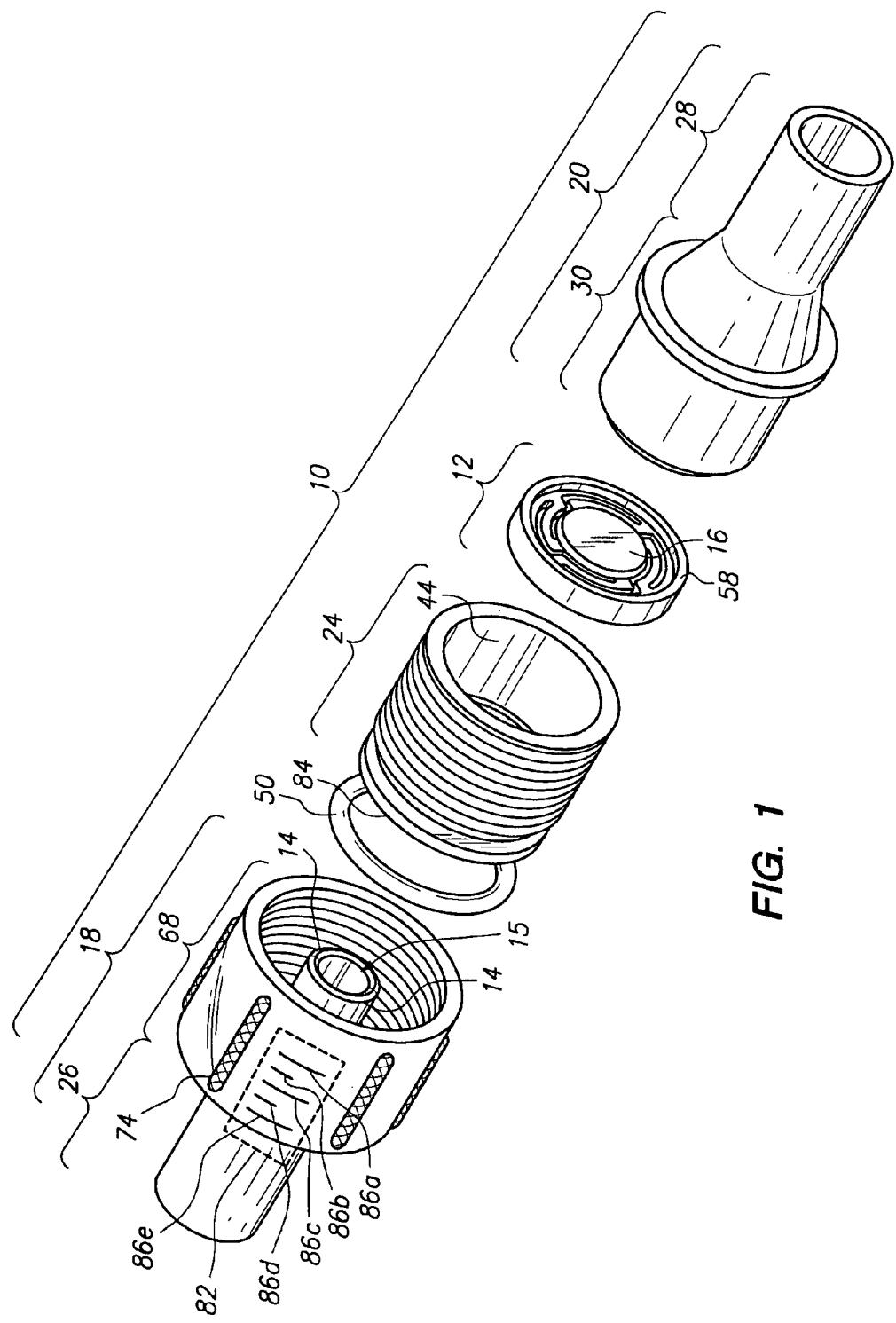
FIG. 1 is an exploded perspective view of a one-way flow valve.
Figure 2:
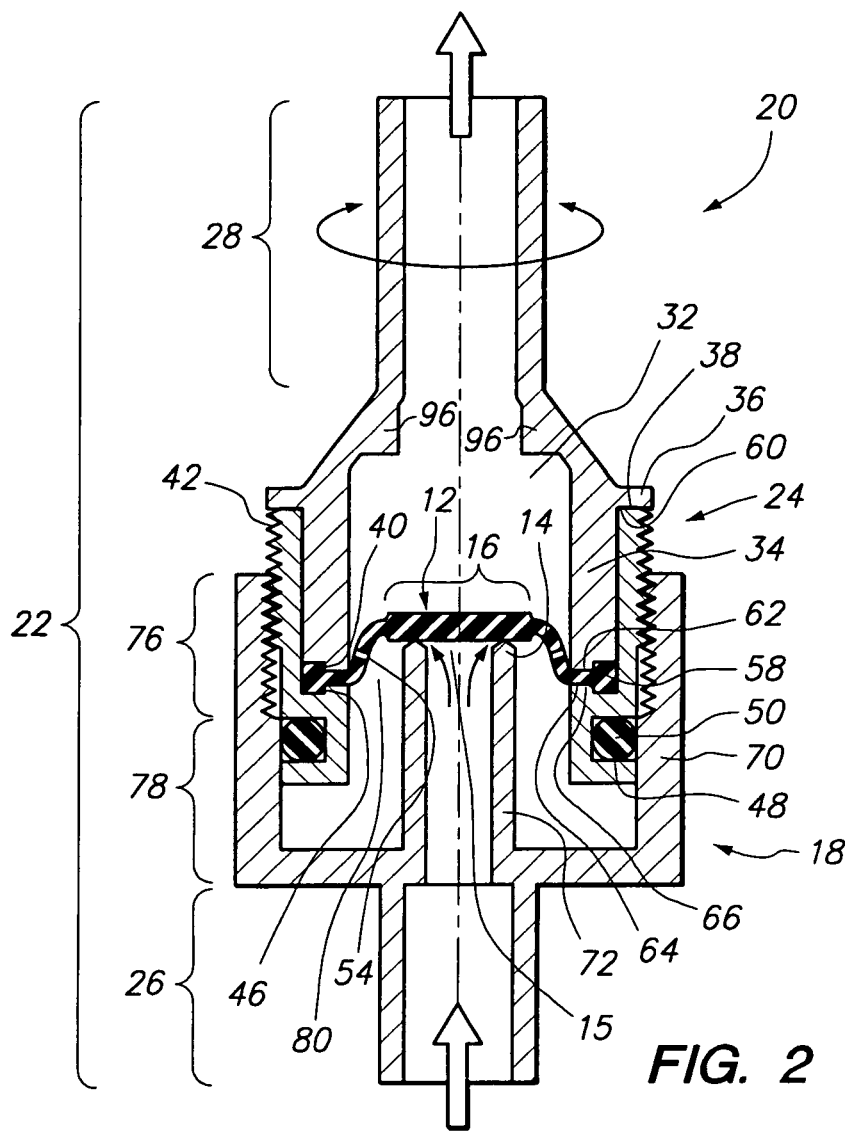
FIG. 2 is a cross-sectional view of the one-way flow valve shown in FIG. 1 after assembly.

Referring now to FIGS. 1-7, a one way flow valve 10 is shown in which an opening pressure may be increased or decreased in the range preferably between 0 PSI to about 2 PSI or greater. The one way flow valve discussed herein may have a low opening pressure (i.e., generally low single digit psi). As shown in FIGS. 1 and 2, the one-way flow valve 10 may have a valve member 12 seated on a rim portion 14 of an orifice. The valve member 10 forms a seal with the rim portion 14 when a pressure difference between a pressure upstream of the valve member 12 and a pressure downstream of the valve member 12 is less than the opening pressure. More particularly, a disc portion 16 may be biased against the rim portion 14 to create a fluidic seal therebetween and prevent any fluid from flowing in the reverse direction or flowing in the forward direction when the pressure difference across the valve member is less than the opening pressure. When the pressure difference between the downstream and upstream pressures is greater than or equal to about the desired opening pressure, then the force of the fluid exerted on the disc portion 16 overcomes the biasing force pressing the disc portion 16 on the rim portion 14 thereby allowing fluid to flow through the one-way flow valve 10. Conversely, when the pressure difference between the downstream and upstream pressures is less than the desired opening pressure, then the force of the fluid exerted on the disc portion 16 does not overcome the biasing force pressing the disc portion 16 on the rim portion 14 thereby no fluid is allowed to flow through the one-way flow valve 10. To increase or decrease the desired opening pressure, first and second sections 18, 20 of a housing 22 may be threaded into or out of each other to respectively increase or decrease the biasing force acting upon the valve member 12, and more particularly, the disc portion 16 against the rim portion 14.

The one-way flow valve may comprise the housing 22, a valve member 12 and a collet 24. The housing 22 may comprise the first and second sections 18, 20. The first and second sections 18, 20 may collectively define a fluid flow passageway from an adaptor portion 26 of the first section 18 to an adaptor portion 28 of the second section 20. During operation, fluid may flow from the adaptor portion 26 of the first section 18 to the adaptor portion 28 of the second portion 20 when the pressure difference between the upstream and downstream pressures across the valve member 12 is greater than the opening pressure which is typically between 0 PSI and about 2 PSI or greater. Conversely, when the pressure difference is less than the opening pressure, then no fluid will flow through the one-way flow valve 10. Moreover, in the event that there is a negative pressure difference across the valve member 12, fluid will not back flow from the adaptor portion 28 of the second section 20 to the adaptor portion 26 of the first section 18.

The second section 20 may comprise the adaptor portion 28 as well as an upstream portion 30. The upstream portion 30 may have an enlarged internal cavity 32. The internal cavity 32 of the upstream portion 30 of the housing's second section 20 may be defined by a generally cylindrical wall 34. From the generally cylindrical wall 34, a flange 36 may extend radially outward and may define surface 38. A distal end portion of the upstream portion 30 may be notched 40 about its outer periphery.

The collet 24 may have a generally cylindrical configuration with external threads 42. Preferably, they are fine pitch threads. An inner surface 44 (see FIG. 1) of the collet 24 may be generally smooth and be sized to have a snug fit over the cylindrical wall 34 of the housing's second section 20. The inner surface 44 of the collet 24 may transition into a notch 46 which may have a generally mirror configuration compared to the notch 40, as shown in FIG. 2. The distal end portion of the collet 24 may also have a groove 48 sized and configured to receive an o-ring 50. The o-ring 50 provides a fluid tight seal between the collet 24 and the housing's first section 18.

Figure 3:
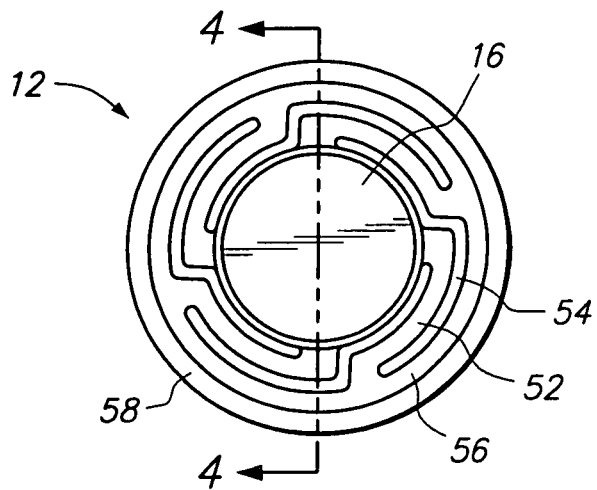
FIG. 3 is a top view of a valve member shown in FIG. 1.
Figure 4:
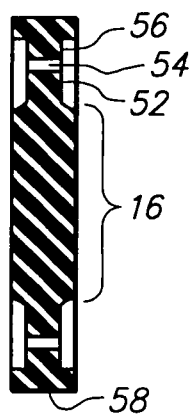
FIG. 4 is a cross-sectional view of the valve member shown in FIG. 3.

The valve member 12 may comprise a generally flat disc portion 16. The flat disc portion 16 may also be identified as a plug. It is contemplated that the plug may have a flat disc configuration but may have other configurations that are also effective at stopping fluid flow through the one-way flow valve 10. For example, the disc portion 16 may have other configurations such as frusto conical, conical, semi-spherical, spherical, etc. Preferably, the disc portion 16 is fabricated from an elastomeric material such as silicone or other material that provides an optimal sealing effect between the disc portion 16 and the rim portion 14. Preferably, the disc portion 16 is generally rigid or remains rigid despite the pressures imposed upon the disc portion 16 by the fluid passing through the one-way flow valve 10. Moreover, the disc portion 16 may have an elastic smooth external surface for providing a sealing effect between the disc portion 16 and the rim portion 14. A plurality of connecting arm portions 52 may extend outward from the disc portion 16 in a serpentine configuration, as shown in FIG. 3. Due to the interlocking serpentine configuration of the connecting arm portions 52, the connecting arms portions 52 also may have openings 54 formed adjacent the connecting arm portions 52. The outer distal end portions of the connecting arm portions 52 may be attached to a ring portion 56. As can be seen in FIG. 4, the thickness of the disc portion 16 may be substantially thicker than the thickness of the connecting arm portion 52 as well as the ring portion 56.

Preferably, the disc portion 16 may be twice as thick as the connecting arm portions 52. As shown in FIG. 3, four connecting arm portions 52 may extend from the disc portion 62 and be attached to the ring portion 56. A perpendicularly oriented flange 58 (see FIGS. 2-4) may be attached to the outer periphery of the ring portion 56. A thickness of the ring portion 56 may be about equal to the thickness of the disc portion 16, as shown in FIG. 4.

As shown in FIG. 2, the valve member 12 may be fixedly attached to the second section 20 of the housing 22. To install the valve member 12, the collet 24 may be initially disengaged or disconnected from the housing's second section 20. The valve member 12 may be placed against the distal end of the second section 20 with the flange 58 disposed within the notch 40. At this point, the valve member 12 may be flat and unbiased as shown in FIG. 4 and not biased as shown in FIG. 2. Thereafter, the collet 24 may be slid over the cylindrical wall 34 of the upstream portion 30 of the housing's second section 20. The collet 24 is slid over the cylindrical wall 34 until a proximal end 60 of the collet 24 contacts the surface 38 of the flange 36. The surface 38 of the flange 36 may be attached or secured to the proximal end 60 of the collet 24 via various methods known in the art including but not limited to ultrasonic welding, adhesion, etc. At this point, the flange 58 of the valve member 12 may be snuggly disposed within the notch 46 of the collet 24 and the notch 40. Also, as shown in FIG. 2, the ring portion 56 of the valve member 12 may be snuggly held between a distal end 62 of the second section 20 and a proximal end 64 of a tang 66 of the collet 24. The o-ring 50 may now be placed within the groove 48.

The first section 18 of the housing 22 may comprise the adaptor portion 26 and a downstream portion 68, as shown in FIG. 1. The downstream portion 68 may have an outer cylindrical wall 70 and an inner cylindrical wall 70. The outer cylindrical wall 70 may have knurls 74 or gripping members 74 on an outer surface thereof as shown in FIG. 1 to assist in the threadable engagement or disengagement of the first and second housing sections 18, 20. The inner surface of the outer cylindrical wall 70 may have a threaded portion 76 (see FIG. 2) and a smooth portion 78 (see FIG. 2). The threaded portion 76 of the outer cylindrical wall 70 may engage the external threads 42 of the collet 24. Preferably, there is a slight resistance to threadable engagement between the threaded portion 76 and the external threads 42. This will prevent the inadvertent loosening or tightening of the first and second housing section 18, 20 while the one-way flow valve 10 is in use. When the external threads 42 has sufficiently engaged the threaded portion 76, the disc portion 16 may be slightly biased against the rim portion 14 (see FIG. 2) such that a slight pressure differential across the disc portion 16 produces fluid flow through the one-way flow valve 10. At this point, moreover, as can be seen in FIG. 2, the o-ring 50 engages the smooth portion 78 of the outer cylindrical wall 70 which may form a fluid tight seal between the collet 24 and the outer cylindrical wall 70. The collet 24 and the housing's second section 20 may have a fluid tight seal formed therebetween upon ultrasonic welding or the attachment of the surface 38 and the proximal end 60 of the collet 24. Alternatively, the fluid tight seal may be formed by a tight snug fit of the flange 58 within the notches 40, 46. When fluid flows from the housing's first section 18 to the housing's second section 20, the fluid presses against the disc portion 16 until the fluid pressure overcomes the biasing force acting upon the disc portion 16. At this point, the pressure difference across the disc portion 16 is greater than the opening pressure of the one-way flow valve 10. The fluid may then temporarily retract back into an internal cavity 80 (see FIG. 2) of the housing's first section defined by the inner and outer cylindrical walls 72, 70 and be forced through the openings 54 (see FIG. 2) of the valve member 12 and through the second section 20.

The connecting arm portions 52 of the valve member may behave as springs which bias the disc portion 16 against the rim portion 14. At its normal position shown in FIG. 4, the connecting arm portions 52 do not bias the disc portion 16 in any direction. However, as the external threads 42 of the collet 24 engage the threaded portion 76 of the outer cylindrical wall 70, the rim portion 14 may begin to press against the disc portion 16 thereby causing the disc portion 16 to be offset from the flange 58, as shown in FIG. 2. The connecting arm portions 52 may primarily bend in order to bias the disc portion 16 against the rim portion 14. The connecting arm portions 52 may have a low spring rate to provide a small biasing force on the disc portion 16 against the rim portion 14. As the external threads 42 are further engaged into the threaded portion 76 of the outer cylindrical wall 70, the rim portion 14 pushes against the disc portion 16 thereby flexing the connecting arm portion 52 to a greater extent and increasing the biasing force acting on the disc portion 16 against the rim portion 14. The o-ring 50 also slides down the smooth portion 78 of the outer cylindrical wall 70 thereby maintaining fluid tight seal between the collet 24 and the first housing section 18. The external threads 42 may be further engaged into the threaded portion 76 until the one-way flow valve 10 is set to the desired opening pressure. The greater the biasing force created by the connecting arm portions 52, the greater the opening pressure. Conversely, the lesser the biasing force created by the connecting arm portions 52, the lesser the opening pressure.

The inner cylindrical wall 72 may partially define the fluid flow passageway through the one-way flow valve 10. The inner cylindrical wall 72 may protrude from the adaptor portion 26. The inner cylindrical wall 72 may also define the rim portion 14. As shown in FIG. 2, the rim portion 14 may have a center beveled tip. In this manner, when the fluid attempts to back flow through the valve 10, the back flow pressure presses upon the disc portion 16 and the rim portion 14 digs into the disc portion 16 to prevent any back flow of fluid. It is also contemplated that the rim portion 14 may have other configurations including but not limited to an inner beveled configuration, outer beveled configuration, a round tip or other configuration that is capable of forming a seal between the disc portion 16 and the rim portion 14.

The outer cylindrical wall 70 may be fabricated from a transparent material. The outer surface of the outer cylindrical wall 70 may have graduated markings 82. The distal end 84 may be visible through the outer cylindrical wall 70. When the distal end 84 of the collet 24 reaches the first graduation 86a, the rim portion 14 may slightly contact the disc portion 16. At this position, a slight pressure differential across the valve member 12 may cause fluid to flow through the one-way valve 10. However, any back flow pressure will cause the disc portion 16 to seal against the rim portion 14 to prevent any back flow of fluid through the one-way flow valve 10. Each of the graduations 86a, b, c, d, e may correspond to a desired opening pressure such that when the distal end 84 is aligned with a respective graduation mark, the opening pressure of the one-way flow valve 10 is set to the corresponding opening pressure. The graduations 86a-e may be calibrated and labeled to allow fluid to flow through the one-way flow valve 10 at a specific pressure. To further make the distal end clear to a user through the outer wall 70, the distal end 84 may be colorized (e.g., green, blue, etc.) such that the operator may clearly see the distal end 84 through the optionally transparent outer cylindrical wall 70.

Figure 5:
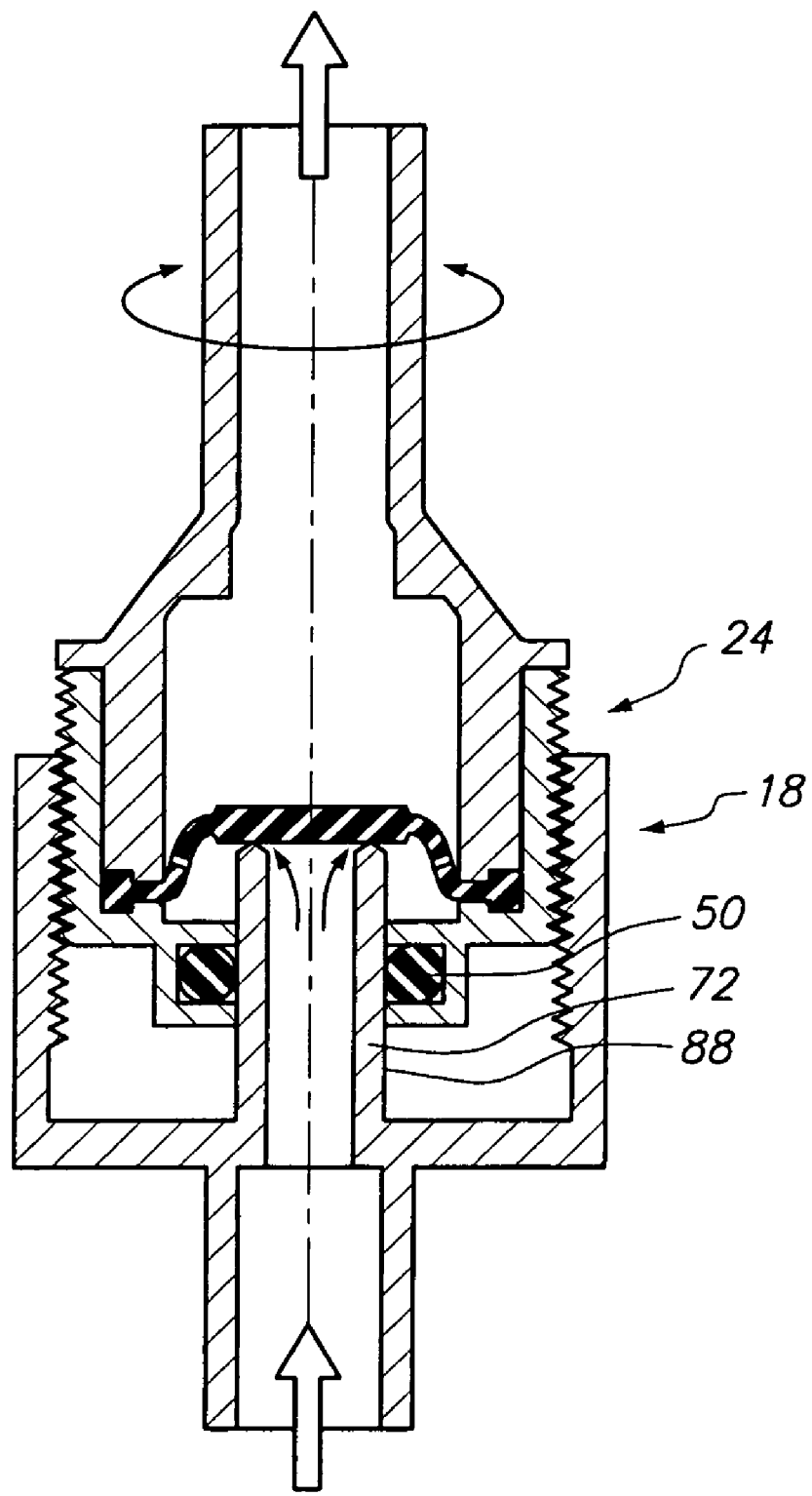
FIG. 5 is a cross-sectional view of a second embodiment of the one-way flow valve.

Referring now to FIG. 5, an alternate embodiment to that shown in FIGS. 1-4 is shown. More particularly, the o-ring 50 may engage a smooth outer surface 88 of the inner cylindrical wall 72 to thereby provide a fluid tight seal between the collet 24 and the first section 18 of the housing 22. The embodiment shown in FIG. 5 may operate substantially similar to the embodiment shown in FIGS. 1-4.

Figure 6:
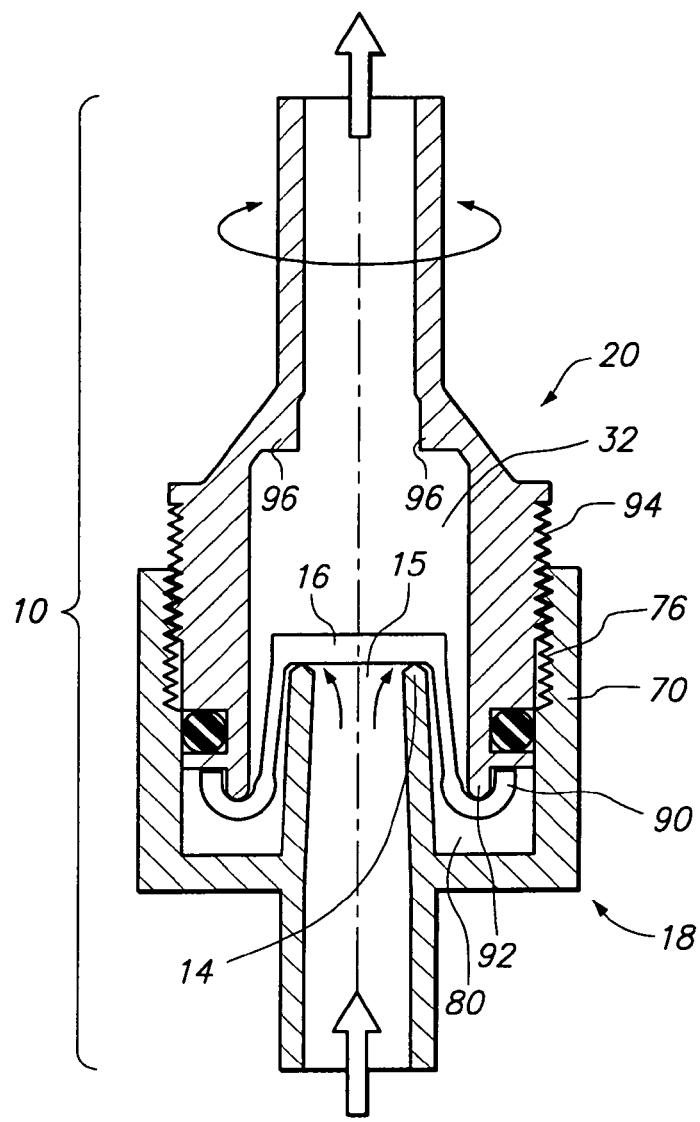
FIG. 6 is a cross-sectional view of a third embodiment of the one-way flow valve.
Figure 7:
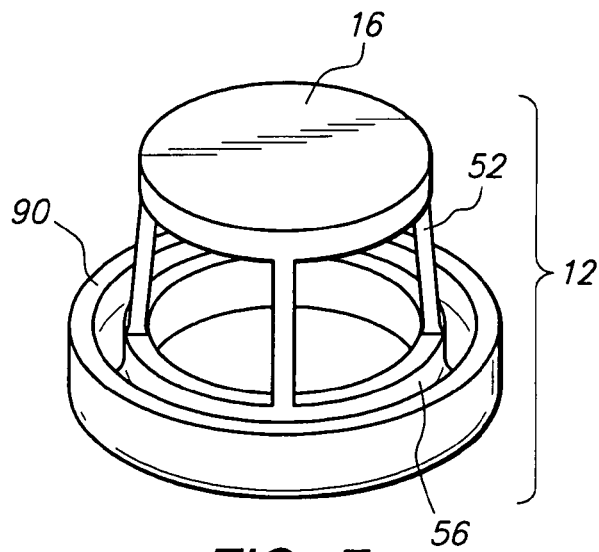
FIG. 7 is a perspective view of a valve member shown in FIG. 6.

Referring now to FIGS. 6 and 7, an alternate embodiment of the one-way flow valve 10 is shown. As shown in FIG. 7, the valve member 12 may have a hat configuration. The valve member 12 may have a disc portion 16 connected to a plurality of connecting arm portions 52. There may be four connecting arm portions 52 but it is contemplated that any number of connecting arm portions 52 may be used. Preferably, the connecting arm portions 52 are evenly distributed about the periphery of the disc portion 16. Each of the connecting arm portions 52 may also be attached to a ring portion 56. From the ring portion 56, the valve member 12 may have a reversed lip portion 90.

As can be seen in FIG. 6, the one-way flow valve 10 does not incorporate a collet 24 as compared to the embodiments shown in FIGS. 1-5. In the embodiment shown in FIGS. 6 and 7, the valve member 12 may be attached to the distal end portion of the second section 20 through any method known in the art such as sonic welding, adhesive, etc.

The disc portion 16 of the valve member 12 may be biased against the rim portion 14 by stretching the connecting arm portions 52 instead of bending the connecting arm portions 52 as described in relation to the embodiments shown in FIGS. 1-4.

To assemble the one-way flow valve 10, the valve member 12 may be inserted into the internal cavity 32 of the second section 20, as shown in FIG. 6. The lip portion 90 may hug the flange 92 of the second section 20. Thereafter, the lip portion 90 may be secured or otherwise attached to the flange 92. The second section 20 may now have external threads 94 which may be threadingly engaged to the internal threads 76 formed on the outer cylindrical wall 70. As the external threads 94 threadingly engage the internal threads 76, the rim portion 14 may slightly push against the disc portion 16. At this point, any pressure differential across the disc portion 16 may cause fluid to flow through the one-way flow valve 10 in the direction of the arrows shown in FIG. 6. However, in the event that negative pressure differential is experienced across the disc portion 16, the disc portion 16 may form a fluid tight seal against the rim portion 14 to prevent any backflow of fluid through the one-way flow valve 10. The external threads 94 may continue to be threaded into the internal threads 76 of the outer wall 70. This stretches the connecting arm portions 52 so as to bias the disc portion 16 against the rim portion 14.

The external threads 94 may further be engaged into the internal threads 76 to increase the biasing force of the disc portion 16 against the rim portion 14 to thereby increase the desired opening pressure. When the desired opening pressure is reached, then the operator may stop threading the external threads 94 into the internal threads 76. There may be a slight resistance to threading between the threads 76 and 94 such that the opening pressure of the one-way flow valve 10 does not change during use.

When fluid exerts a pressure differential across the disc portion 16 greater than or equal to about the set opening pressure, the fluid pressure overcomes the biasing force created by the connecting arm portions 52 such that the disc portion 16 is now gapped away from the rim portion 14. The fluid then temporarily flows in a reverse direction into the internal cavity 80 of the housing's first section 18. The fluid then flows past the disc portion 16 through the internal cavity 32 and out of the second section 20 of the housing 22.

The various aspects of the valve 10 described in relation to FIGS. 1-5 may also be incorporated into the valve 10 described in relation to FIGS. 6 and 7. By way of example and not limitation, the first section 18 of the housing 22 may have gripping members 74 and graduation marks 82, as discussed above.

In an aspect of the one-way flow valve 10, the second section 20 of the housing 22 may have a boss 96 downstream of the disc portion 16. The boss 96 may be evenly distributed about the inner periphery of the second section 20 of the housing 22. In the event that the pressure difference across the disc portion 16 is excessive, the disc portion 16 may rest on the bosses 96. The fluid may still be allowed to flow through the valve 10 around the disc portion 16 and through gaps formed between adjacent bosses 96.

In an aspect of the one-way flow valves 10, the connecting arm portions 52 may have a low spring rate constant such that the opening pressure of the one-way flow valve may be accurately set even with gross adjustments to the insertion distance of second section of the housing into the first section of the housing. More particular, as discussed above, the connecting arm portions 52 of the valve member 12 behave as springs which bias the disc portion 16 against the rim portion 14. As the second section 20 of the housing 22 is inserted deeper into the first section 18 of the housing 22, the connecting arm portions 52 either bend or stretch to increase the biasing force upon which the disc portion 16 is forced against the rim portion 14. Since the connecting arm portions 52 may have a low spring constant, the insertion depth of the second section 20 of the housing 22 into the first section 18 of the housing 22 does not have to be controlled as acutely if the connecting arm portions 52 had a large spring rate constant. The one way flow valve 10 discussed herein may optionally and preferably have fine pitch threads which may allow a user to slowly insert the second section into the first section of the housing such that a large rotation of the first or second sections 18, 20 of the housing 22 inserts the second section 20 into the first section a small distance.

The above description is given by way of example, and not limitation. Given the above disclosure, one skilled in the art could devise variations that are within the scope and spirit of the invention disclosed herein, including various ways of securing the collet 24 to the second section 20 of the housing 22. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A unidirectional flow valve defining an opening pressure that allows fluid to flow through the unidirectional flow valve, the unidirectional flow valve comprising:

a housing having a fluid flow passageway, the fluid flow passageway defined by an orifice and an exit aperture, the housing having first and second sections threadably engaged to each other to a selective depth for adjusting the opening pressure, the orifice defined by the first section, the exit aperture defined by the second section, the first section having an inner wall and an outer wall circumscribed about the inner wall, the outer wall having internal threads and the inner wall defining the orifice periphery, the second section having a wall with external threads threadably engageable to the internal threads of the first section to the selective depth to increase or decrease a spring force of the spring until the desired opening pressure is attained; and a valve member disposed in a middle portion of the fluid flow passageway, the valve member comprising:

a plug traversable between a seated position wherein the plug is in contact with a periphery of the orifice when a pressure difference between a pressure upstream to the plug and a pressure downstream to the plug is less than the opening pressure to prevent backflow of fluid and an unseated position wherein the plug is gapped away from at least a portion of the orifice periphery when the pressure difference is greater than the opening pressure;

a base member being sonically welded, adhered or locked in with a collet to an upstream end portion of the second section of the housing;

a spring having first and second opposed end portions, the first end portion being attached to the base, the second end portion being attached to the plug;

wherein the plug and base member are selectively traversable away from each other or closer to each other as the first and second sections of the housing are threaded into each other to the selective depth to respectively increase or decrease the opening pressure until a desired opening pressure is attained.

2. The valve of claim 1 wherein the orifice has an edge and the plug is in contact with the edge when in the seated position.

3. The valve of claim 1 wherein the plug is a generally flat member.

4. The valve of claim 1 wherein the threads of the first and second sections are sufficiently long to permit the base member to extend upstream the orifice periphery to push the plug against the orifice periphery.

5. The valve of claim 1 wherein the orifice periphery extends from the first section and into an internal cavity of the second section of the housing and is in fluid communication with the housing's fluid flow passageway, the base member being traversable behind the orifice periphery to push the plug against the orifice periphery.

6. The valve of claim 1 wherein the upstream end portion of the second section is traversable behind the orifice periphery when the threads of the first and second sections are engaged.

7. The valve of claim 1 wherein the base member of the valve member is normally in the same plane as the plug.

8. The valve of claim 7 wherein the spring comprises connecting arm portions that bend to bias the plug toward and against the orifice periphery.

9. The valve of claim 8 wherein the connecting arm portions have a serpentine configuration.

10. The valve of claim 1 wherein the base member of the valve member is normally offset from the plug.

11. The valve of claim 10 wherein the springs are connecting arm portions that stretch to bias the plug toward and against the orifice periphery.

12. The valve of claim 1 further comprising an o-ring between first and second sections of the housing to provide a fluidic seal as the threaded engagement between the first and second sections of the housing is adjusted.

\* \* \* \* \*